(12) United States Patent
Hiroe et al.

(10) Patent No.: US 10,611,225 B2
(45) Date of Patent: Apr. 7, 2020

(54) WEATHER STRIP FOR AUTOMOBILE

(71) Applicant: TOKAI KOGYO CO., LTD., Obu-shi, Aichi (JP)

(72) Inventors: Keiji Hiroe, Obu (JP); Akito Ueda, Obu (JP); Kotaro Oka, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 15 days.

(21) Appl. No.: 16/062,989

(22) PCT Filed: Sep. 1, 2016

(86) PCT No.: PCT/JP2016/075646
§ 371 (c)(1),
(2) Date: Jun. 15, 2018

(87) PCT Pub. No.: WO2017/110149
PCT Pub. Date: Jun. 29, 2017

(65) Prior Publication Data
US 2018/0370343 A1 Dec. 27, 2018

(30) Foreign Application Priority Data

Dec. 22, 2015 (JP) .................................. 2015-249187

(51) Int. Cl.
*B60J 10/84* (2016.01)
*B60J 10/24* (2016.01)
(Continued)

(52) U.S. Cl.
CPC ............... *B60J 10/84* (2016.02); *B29C 48/15* (2019.02); *B60J 10/22* (2016.02); *B60J 10/24* (2016.02); *B60J 10/32* (2016.02); *B60R 13/06* (2013.01)

(58) Field of Classification Search
CPC ... B60J 10/84; B60J 10/24; B60J 10/32; B60J 10/16
See application file for complete search history.

(56) References Cited

U.S. PATENT DOCUMENTS 5,433,808 A * 7/1995 Yada .................... B60R 19/445
156/244.15
9,738,146 B2 * 8/2017 Daio ........................ B60J 10/25
(Continued)

FOREIGN PATENT DOCUMENTS

JP S56-76542 U 6/1981
JP H03-104749 A 5/1991
(Continued)

OTHER PUBLICATIONS

Nov. 15, 2016 International Search Report issued in International Patent Application No. PCT/JP2016/075646.
(Continued)

*Primary Examiner* — Justin B Rephann
(74) *Attorney, Agent, or Firm* — Oliff PLC

(57) ABSTRACT

The weather strip configured to be attached to the automobile body opening portion is an elongated member having a length configured to correspond to a side portion and a corner portion of the automobile body opening portion and includes a hollow sealing portion. A surface of the sealing portion corresponding to a floor-side side portion and a surface of the sealing portion corresponding to a floor-side corner portion are continuous to each other. A wall thickness of the sealing portion corresponding to the floor-side side portion is set to be smaller than a wall thickness of the sealing portion corresponding to the floor-side corner portion. The sealing portion corresponding to the floor-side side portion includes a portion having a smallest wall thickness among the entire sealing portion.

2 Claims, 7 Drawing Sheets

(51) Int. Cl.
*B60R 13/06* (2006.01)
*B29C 48/15* (2019.01)
*B60J 10/32* (2016.01)
*B60J 10/22* (2016.01)

(56) References Cited

U.S. PATENT DOCUMENTS

| | | | | |
|---|---|---|---|---|
| 2004/0227306 A1* | 11/2004 | Kuzuya | ............... | B60J 10/24 |
| | | | | 277/637 |
| 2005/0064135 A1* | 3/2005 | Perrin | ............... | B60J 10/24 |
| | | | | 428/122 |
| 2008/0000165 A1* | 1/2008 | Ochiai | ............... | B60J 10/24 |
| | | | | 49/490.1 |
| 2012/0240473 A1* | 9/2012 | Minoura | ............... | B60J 10/24 |
| | | | | 49/489.1 |
| 2014/0311040 A1* | 10/2014 | One | ............... | B60J 10/30 |
| | | | | 49/490.1 |

FOREIGN PATENT DOCUMENTS

| | | |
|---|---|---|
| JP | H05-031784 A | 2/1993 |
| JP | H09-309136 A | 12/1997 |
| JP | H10-006776 A | 1/1998 |
| JP | 2007-290586 A | 11/2007 |
| JP | 2014-196054 A | 10/2014 |

OTHER PUBLICATIONS

Nov. 15, 2016 Written Opinion issued in International Patent Application No. PCT/JP2016/075646.

* cited by examiner

FIG.1
(A)
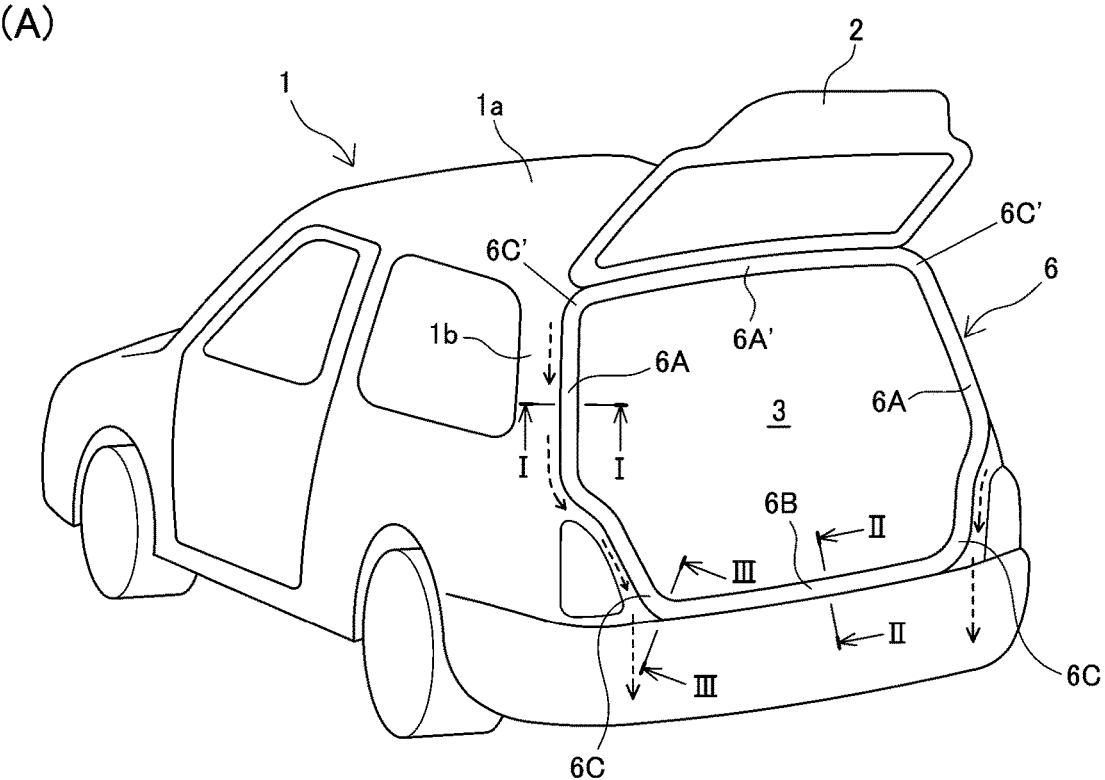
(B)
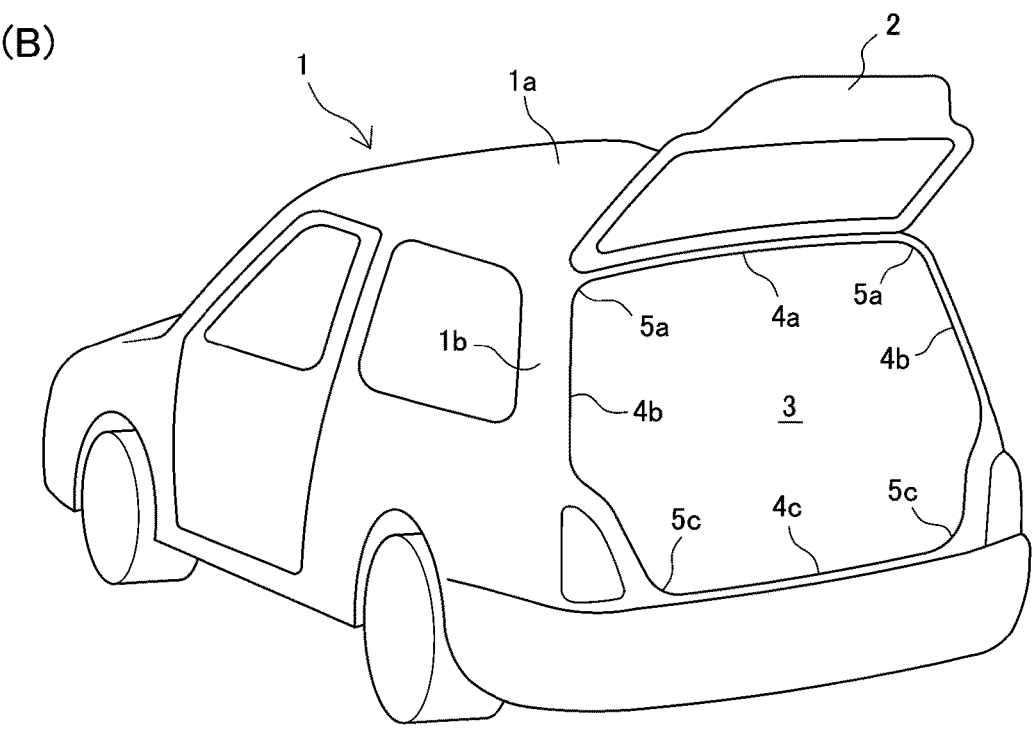

FIG.5
(A)
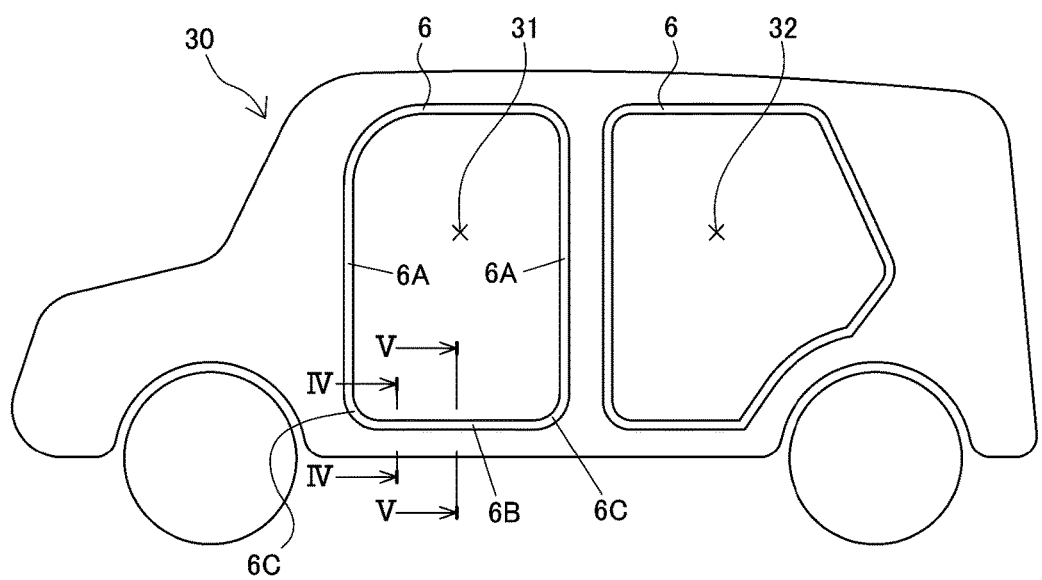
(B)
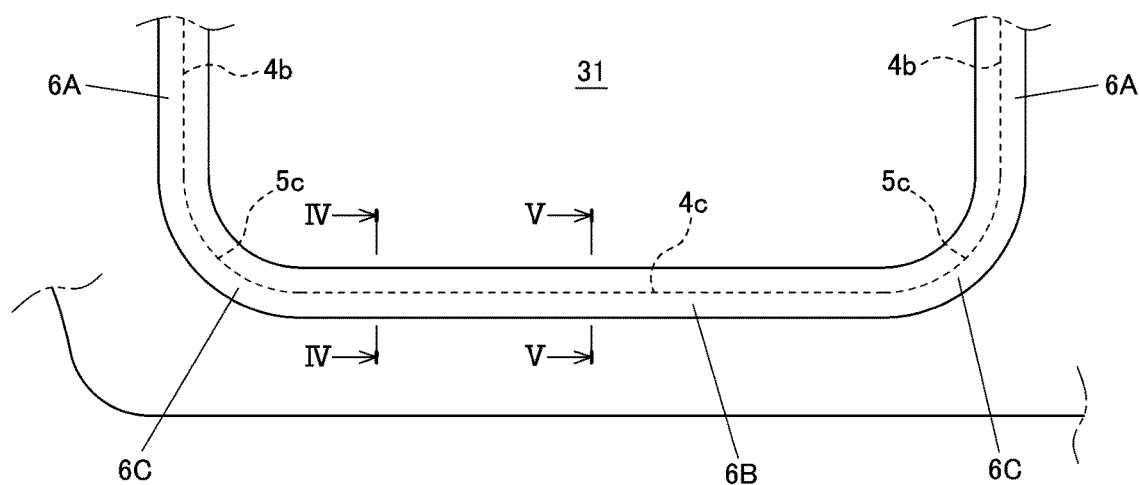

WEATHER STRIP FOR AUTOMOBILE

TECHNICAL FIELD

The present invention relates to a weather strip and particularly relates to a weather strip for an automobile that is attached to an opening edge of an automobile body opening portion of the automobile and includes a hollow sealing portion.

BACKGROUND ART

Generally in an automobile, a weather strip for sealing a gap between an opening edge of an automobile body opening portion (for example, a back door opening portion, a trunk opening portion, a front door opening portion, a rear door opening portion, and the like) and a peripheral portion of a door body (for example, a back door, a trunk lid, a front door, a rear door, and the like) that can close the automobile body opening portion is provided. In order to prevent entering of wind and rain, dust, sound, and the like into an automobile interior, the weather strip is required to have high sealing performance.

Incidentally, the opening edge of the automobile body opening portion is bordered with a combination of a side portion that extends substantially linearly and a corner portion that is curved to connect the side portion to another side portion. In many cases, the weather strip has a length corresponding to the opening edge of the automobile body opening portion and is mounted along the opening edge. Therefore, it is necessary to attach the weather strip to the corner portion while curving the weather strip. However, in a case where the weather strip is curved to correspond to the corner portion, unnatural deformation (for example, corrugation or falling of the sealing portion) occurs in the hollow sealing portion of the weather strip, which may cause partial deterioration in sealing performance. Thus, various countermeasures for preventing the unnatural deformation of the sealing portion are proposed. For example, Patent Document 1 discloses a configuration in which the thickness (wall thickness) of the sealing portion corresponding to the corner portion is set to be larger than the thickness (wall thickness) of the sealing portion corresponding to the side portion (refer to "ABSTRACT" of Patent Document 1). In addition, Patent Document 2 discloses a configuration in which the sealing portion of the weather strip is molded in a shape corresponding to a shape of the corner portion (refer to the claims of Patent Document 2).

CITATION LIST

Patent Document

[Patent Document 1]: JP-A-H05-31784
[Patent Document 2]: JP-A-H03-104749

SUMMARY OF INVENTION

Technical Problem

Despite the above-described countermeasures of the related art, particularly in the rain water, water leakage is likely to occur at a side portion of an upper edge (in the vicinity of a roof) and corner portions on both sides of the side portion of the automobile body opening portion, and there is an inconvenience that leakage becomes conspicuous when water leakage actually occurs. Thus, to be on the safe side, usually, the wall thickness of the sealing portion of the weather strip attached to the side portion of the automobile body opening portion is uniformly set based on the wall thickness of the sealing portion corresponding to the upper edge of the automobile body opening portion where water leakage is likely to occur.

However, when the flow of rain water falling on the roof of the automobile body is carefully observed, the rain water is collected in the corner portion through the side portion of the upper edge (in the vicinity of the roof) of the automobile body opening portion, the collected rain water further flows down along a pillar portion of an automobile body side surface and falls down to the ground through the vicinity of a corner portion of a lower edge side (floor side) of the automobile body opening portion. That is, the rain water flowing from the roof hardly falls into a side portion (hereinafter, referred to as "floor-side side portion") on the lower edge side of the automobile body opening portion. In this case, the configuration of the weather strip of the related art in which the wall thickness of the sealing portion corresponding to the floor-side side portion is set to be the same as the wall thickness of the sealing portion corresponding to side portions other than the floor-side side portion can be considered to be an excessive quality. This wall thickness setting of excessive quality causes undesirable results, for example, an increase in costs due to the use of unnecessary materials, an increase in weight of the weather strip, and an increase in closing load (closing resistance) at the time of closing of the door body.

An object of the present invention is to provide a weather strip for an automobile capable of being attached to an opening edge of an automobile body opening portion of an automobile and capable of reducing costs, weight, and a closing load (closing resistance) as compared to related art.

Means for Solving the Problems

According to an invention defined by a first aspect, there is provided a weather strip that is configured to be attached to an automobile body opening portion of an automobile, the automobile body opening portion being bordered with at least one side portion including a floor-side side portion and at least one corner portion which is continuous to the side portion and includes a floor-side corner portion, wherein the weather strip is an elongated member having a length configured to correspond to the side portion and the corner portion of the automobile body opening portion and includes a hollow sealing portion, wherein a surface of the sealing portion corresponding to the floor-side side portion and a surface of the sealing portion corresponding to the floor-side corner portion are continuous to each other, wherein a wall thickness of the sealing portion corresponding to the floor-side side portion is set to be smaller than a wall thickness of the sealing portion corresponding to the floor-side corner portion, and wherein the sealing portion corresponding to the floor-side side portion includes a portion having a smallest wall thickness among the entire sealing portion.

According to the invention defined by the first aspect, the following effects can be obtained. That is, as described above, the rain water flowing from the roof hardly enters into the side portion (floor-side side portion) on the lower edge side of the automobile body opening portion. Therefore, by setting the portion having the smallest wall thickness among the entire sealing portion to the sealing portion corresponding to floor-side side portion, the weight of the weather strip can be reduced, the material costs can be reduced, and a closing load (closing resistance) at the time of the closing of the door body can be reduced, without occurrence of water leakage of rain water or the like.

According to an invention defined by a second aspect, there is provided the weather strip according to the first aspect, wherein the surface of the sealing portion corresponding to the floor-side side portion and the surface of the sealing portion corresponding to the floor-side corner portion are seamlessly continuous to each other.

According to the invention defined by the second aspect, the following effects can be obtained in addition to the effects of the configuration according to the first aspect. That is, in a case where the weather strip according to the invention is manufactured by extrusion molding, a transition section (or boundary region) where the sealing portion corresponding to the floor-side side portion and the sealing portion corresponding to the floor-side corner portion are connected to each other can be set as a gradual change section where the cross-sectional shape successively changes. As a result, a state where the surface of the sealing portion corresponding to the floor-side side portion and the surface of the sealing portion corresponding to the floor-side corner portion are "seamlessly continuous to each other" can be secured. By securing the seamlessly continuous state, sealing performance capable of preventing water leakage or the like can be secured. Contrary to this configuration, in a case where the sealing portion corresponding to the floor-side corner portion is formed using the same molding method as that of the example of the related art, it is not possible to avoid formation of a seam (or a step) at a boundary between the surface of the sealing portion corresponding to the floor-side corner portion and the surface of the sealing portion corresponding to the floor-side side portion, and this seam functions as a large factor of deterioration in the sealing performance of the sealing portion.

According to an invention defined by a third aspect, there is provided the weather strip according to the first or second aspect, wherein the sealing portion corresponding to the floor-side side portion has a uniform cross-sectional shape over the entire length of the floor-side side portion.

According to the invention defined by the third aspect, the following effects can be obtained in addition to the effects of the configuration according to the first or second aspect. That is, according to this configuration, the entire region of the sealing portion corresponding to the floor-side side portion has the smallest wall thickness among the entire sealing portion, and the effects of the configuration according to the first aspect becomes more significant.

According to an invention defined by a fourth aspect, there is provided the weather strip according to the first or second aspect, wherein in the sealing portion corresponding to the floor-side side portion, a wall thickness of a sealing portion corresponding to a center portion of the floor-side side portion is larger than a wall thickness of a sealing portion corresponding to portions of the floor-side side portion other than the center portion.

According to the invention defined by the fourth aspect, the following effects can be obtained in addition to the effects of the configuration according to the first or second aspect. That is, according to this configuration, the wear resistance of the sealing portion corresponding to the center portion of the floor-side side portion is relatively improved, and the repulsive force increases. In particular, due to the improvement of the wear resistance, the durability against damages caused when a person gets in the automobile or a luggage is put into or taken out from the automobile is improved.

Advantageous Effects of the Invention

According to the present invention, a weather strip capable of being attached to an opening edge of an automobile body opening portion of an automobile and capable of reducing the costs, weight, and the closing load (closing resistance) as compared to related art can be provided.

BRIEF DESCRIPTION OF DRAWINGS

FIG. 1 is a schematic view of a back door opening portion of an automobile, wherein (A) is a perspective view illustrating a state where a weather strip according to an embodiment is mounted and (B) is a perspective view illustrating a state where the weather strip is not mounted.

FIG. 5 illustrates the outline of a side door opening portion of the automobile, wherein (A) is a perspective view illustrating a state where a weather strip according to an embodiment is mounted and (B) is an enlarged view illustrating the vicinity of a floor-side side portion of a front door opening portion.

DESCRIPTION OF EMBODIMENTS

Figure 2:
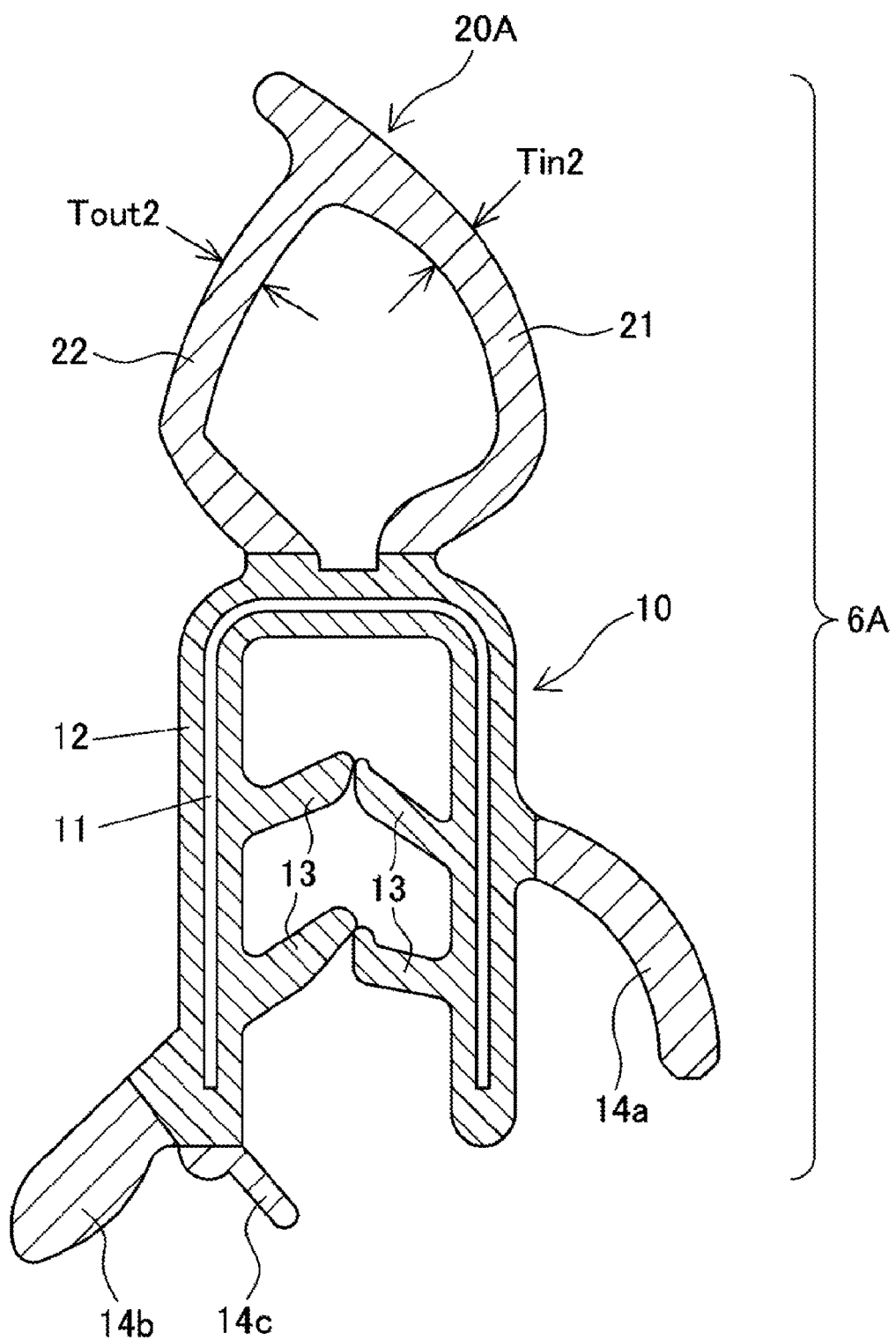
FIG. 2 is a cross-sectional view of the weather strip taken along line I-I of FIG. 1.

Hereinafter, some embodiments of the present invention will be described with reference to the drawings.

First Embodiment

FIGS. 1 to 4 illustrate a weather strip according to a first embodiment of the invention.

(A) and (B) of FIG. 1 illustrate a back door opening portion 3 of a general two-box type automobile 1 in a state where a back door 2 is flipped up. The reference numeral "1a" represents a roof of the automobile, the reference numeral "1b" represents a pillar portion of an automobile rear portion, and arrows indicated by broken lines in (A) of FIG. 1 represent a path of rain water when the rain water falling on the roof 1a flows down along the pillar portion 1b.

As illustrated in (B) of FIG. 1, an opening edge of the back door opening portion 3 is bordered with a combination of substantially four side portions (4a, 4b, 4c) and substantially four corner portions (5a, 5c). The four side portions include: a roof-side side portion 4a that extends substantially horizontally along an upper edge of the back door opening portion 3; a pair of left and right pillar-side side portions 4b that extends along the pillar portion 1b in an up-down direction; and a floor-side side portion 4c that extends substantially horizontally along a lower edge of the back door opening portion 3. The four corner portions include: a pair of left and right roof-side corner portions 5a that are positioned between the roof-side side portion 4a and the pillar-side side portion 4b; and a pair of left and right floor-side corner portion 5c that are positioned between the floor-side side portion 4c and the pillar-side side portion 4b. Each of the corner portions 5a and 5c is a portion that is curved to smoothly connect adjacent two side portions to each other, and thus will also be called "curved portion".

(A) of FIG. 1 illustrates a state where a weather strip 6 is mounted on the opening edge of the back door opening portion 3. The weather strip 6 is formed in an annular shape (or an endless strip shape) corresponding to the opening edge of the back door opening portion 3, and is configured as an elongated rubber member having a length corresponding to the entire peripheral length of the opening edge of the back door opening portion 3 including the side portions and the corner portions. At any position of the weather strip 6 in a longitudinal direction, basic cross-sectional shapes are substantially the same (including a similar shape). However, as described below, the dimension setting of a part of the cross-sectional shape varies depending on the positions.

FIG. 2 illustrates a cross-section taken along line I-I of (A) of FIG. 1, that is, a cross-section of a pillar-side side portion corresponding portion 6A of the weather strip 6 that is attached to the pillar-side side portion 4b of the back door opening portion 3. As illustrated in the drawing, the pillar-side side portion corresponding portion 6A includes: an attachment portion 10; and a sealing portion 20A having a hollow tunnel shape that is disposed adjacent to the attachment portion 10.

The attachment portion 10 is a portion that is directly attached to the opening edge of the back door opening portion 3 serving as an attached member, and includes: a core 11 formed of metal (hereinafter, also referred to as "core metal 11") that is curved in an "inverted U-shape" in cross-section; and a rubber cover portion 12 that is attached to cover the core metal 11. In an inner portion of the rubber cover portion 12, four holding lips 13 that protrude from inner surfaces thereof are provided. An automobile side member (flange) constituting the opening edge of the back door opening portion 3 is interposed between the holding lips 13 such that the weather strip is fixed to the opening edge of the back door opening portion 3. In addition, in an outer end portion of the rubber cover portion 12 and the vicinity of one end portion (in FIG. 2, the vicinity of a left lower end portion) of the attachment portion 10, three auxiliary lips (an interior lip 14a, an exterior lip 14b, and a distal lip 14c) are provided to protrude from outer surfaces thereof. Among the three auxiliary lips, the interior lip 14a is a cover lip for covering an end portion of an interior material such as a carpet or a cloth material. In addition, the exterior lip 14b and the distal lip 14c are lips for sealing gaps between the automobile body and the attachment portion 10 when the weather strip 6 is mounted on the back door opening portion 3.

In addition, in the pillar-side side portion corresponding portion 6A illustrated in FIG. 2, the sealing portion 20A having a hollow tunnel shape is provided adjacent to the upper side of the attachment portion 10. The sealing portion 20A includes an interior wall portion 21 (wall thickness: Tin2) and an exterior wall portion 22 (wall thickness: Tout2). The sealing portion 20A is surrounded by the wall portions 21 and 22 such that a tunnel-shaped hollow region having a substantially rhombic shape in cross-section is secured in the sealing portion 20A. The sealing portion 20A of the pillar-side side portion corresponding portion 6A is directly exposed to rain water, and thus is required to have sufficient sealing performance. Therefore, the wall thicknesses (Tin2, Tout2) of the sealing portion 20A are set such that the back door 2 can pressed at an appropriate load at which water leakage does not occur.

A rubber material which forms the rubber cover portion 12 and the four holding lips 13 in the attachment portion 10 is obtained, for example, by adding carbon black and a vulcanizing agent to EPDM (ethylene propylene diene copolymer). During the manufacturing process, vulcanization (that is, a polymer crosslinking reaction) using the vulcanizing agent is performed. On the other hand, a rubber material which forms the three auxiliary lips 14a to 14c and the sealing portion 20A in the attachment portion 10 is obtained, for example, by adding carbon black, a vulcanizing agent, and a foaming agent to EPDM. During the manufacturing process, vulcanization (that is, a polymer crosslinking reaction) using the vulcanizing agent and foaming (sponging) using the foaming agent are performed. Here, the EPDM sponge rubber material which foams with the foaming agent is softer and has higher flexibility than the EPDM vulcanized rubber material used for forming the rubber cover portion 12 and the like.

In the weather strip 6 according to the embodiment, a roof-side side portion corresponding portion 6A' that is attached to the roof-side side portion 4a of the back door opening portion 3 has the same cross-sectional shape and dimension as the pillar-side side portion corresponding portion 6A. That is, the wall thicknesses of the wall portions 21 and 22 (not illustrated) of the sealing portion of the roof-side side portion corresponding portion 6A' are Tin2 and Tout2, respectively.

Figure 3:
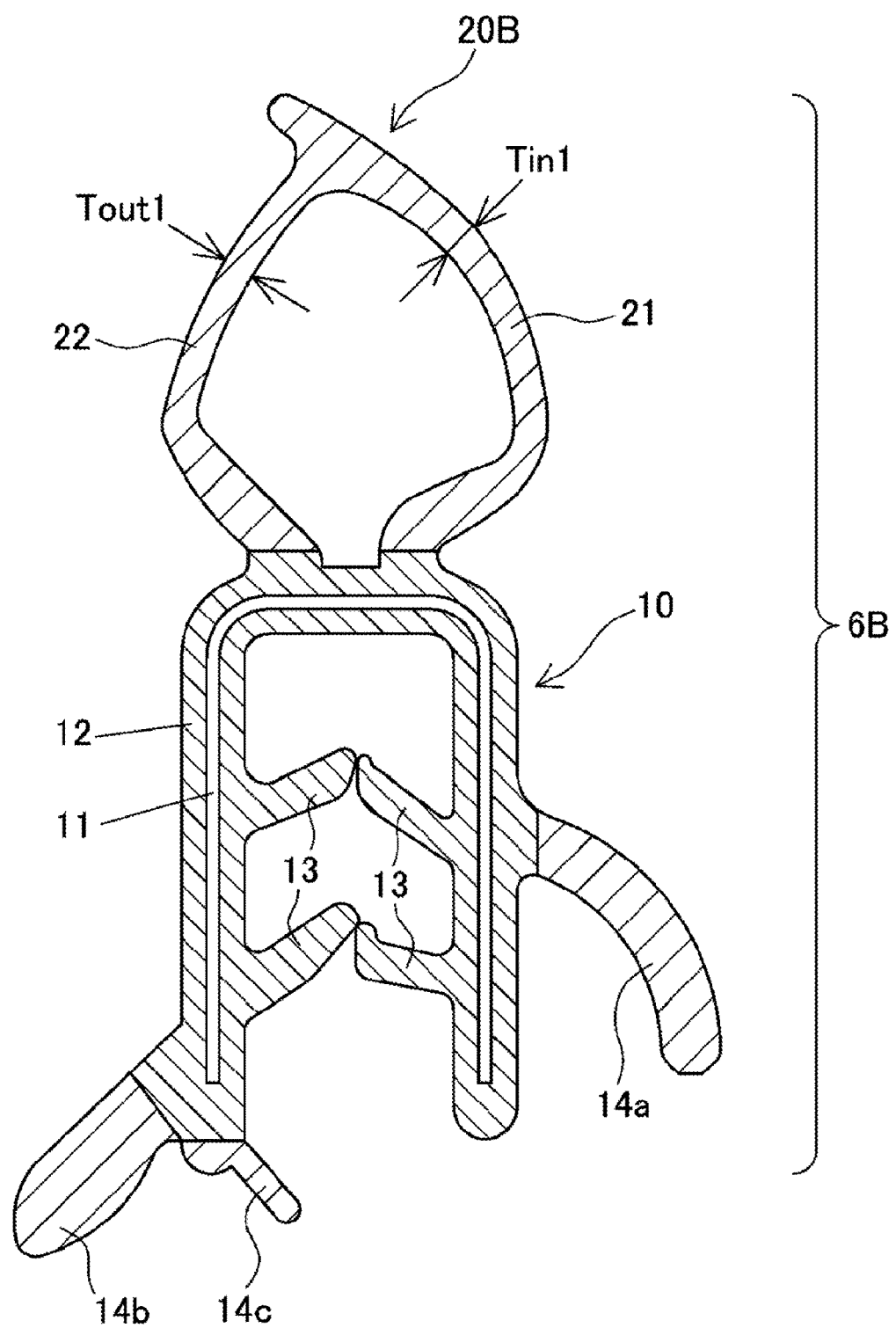
FIG. 3 is a cross-sectional view of the weather strip taken along line II-II of FIG. 1.

FIG. 3 illustrates a cross-section taken along line II-II of (A) of FIG. 1, that is, a cross-section of a floor-side side portion corresponding portion 6B of the weather strip 6 that is attached to the floor-side side portion 4c of the back door opening portion 3. The floor-side side portion corresponding portion 6B also includes the attachment portion 10 and a sealing portion 20B having a hollow tunnel shape. The attachment portion 10 of the floor-side side portion corresponding portion 6B has substantially the same shape and dimension as the attachment portion 10 of the pillar-side side portion corresponding portion 6A.

As illustrated in FIG. 3, the sealing portion 20B having a hollow tunnel shape that is provided adjacent to the upper side of the attachment portion 10 includes an interior wall portion 21 (wall thickness: Tin1) and an exterior wall portion 22 (wall thickness: Tout1). The sealing portion 20B is surrounded by the wall portions 21 and 22 such that a tunnel-shaped hollow region having a substantially rhombic shape in cross-section is secured in the sealing portion 20B. The wall thicknesses Tin1 and Tout1 of the wall portions 21 and 22 of the sealing portion 20B illustrated in FIG. 3 is set to be smaller than the wall thicknesses Tin2 and Tout2 of the wall portions 21 and 22 of the sealing portion 20A of the pillar-side side portion corresponding portion 6A illustrated in FIG. 2 (that is, Tin1<Tin2, Tout1<Tout2). The sealing portion 20B of the floor-side side portion corresponding portion 6B is not likely to be exposed to rain water flowing down from the roof 1a and is not necessary to have the same sealing performance as sealing portion at other positions. Therefore, even in a case where the wall thicknesses Tin1 and Tout1 are small, there are no problems.

Figure 4:
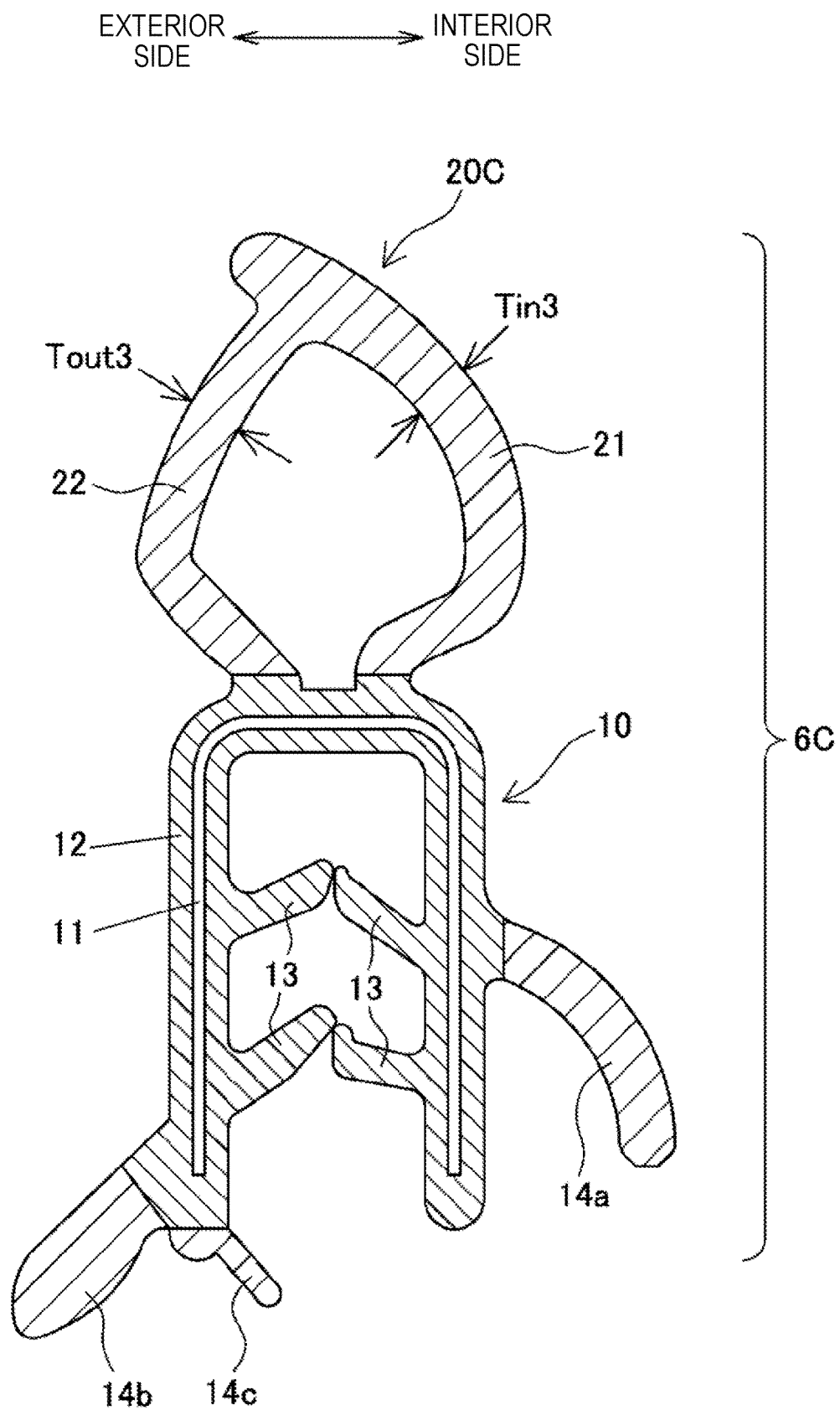
FIG. 4 is a cross-sectional view of the weather strip taken along line of FIG. 1.

FIG. 4 illustrates a cross-section taken along line of (A) of FIG. 1, that is, a cross-section of a floor-side corner portion corresponding portion 6C of the weather strip 6 that is attached to the floor-side corner portion 5c of the back door opening portion 3. The floor-side corner portion corresponding portion 6C also includes the attachment portion 10 and a sealing portion 20C having a hollow tunnel shape. The attachment portion 10 of the floor-side corner portion corresponding portion 6C has substantially the same shape and dimension as the attachment portion 10 of the pillar-side side portion corresponding portion 6A.

As illustrated in FIG. 4, the sealing portion 20C having a hollow tunnel shape that is provided adjacent to the upper side of the attachment portion 10 includes an interior wall portion 21 (wall thickness: Tin3) and an exterior wall portion 22 (wall thickness: Tout3). The sealing portion 20C is surrounded by the wall portions 21 and 22 such that a tunnel-shaped hollow region having a substantially rhombic shape in cross-section is secured in the sealing portion 20C. The wall thicknesses Tin3 and Tout3 of the wall portions 21 and 22 of the sealing portion 20C illustrated in FIG. 4 is set to be larger than the wall thicknesses Tin2 and Tout2 of the wall portions 21 and 22 of the sealing portion 20A of the pillar-side side portion corresponding portion 6A illustrated in FIG. 2 (that is, Tin2<Tin3, Tout2<Tout3). It is preferable that Tin3 (or Tout3) is set to be about 1.4 to 2.0 times Tin2 (or Tout2). This way, by setting the wall thicknesses (Tin3, Tout3) of the sealing portion 20 of the floor-side corner portion corresponding portion 6C of the weather strip to be significantly larger than the wall thicknesses (Tin2, Tout2) of the sealing portion 20A of the pillar-side side portion corresponding portion 6A, the rigidity of the sealing portion 20C of the floor-side corner portion corresponding portion 6C can be made to be higher than the rigidity of the sealing portion 20A of the pillar-side side portion corresponding portion 6A. Accordingly, even in a case where the floor-side corner portion corresponding portion 6C of the weather strip is attached to the floor-side corner portion 5c of the back door opening portion 3 while curving the floor-side corner portion corresponding portion 6C, the sealing portion 20C can be prevented from being unnaturally deformed or from being corrugated.

The weather strip 6 according to the embodiment is manufactured by extrusion molding, and in a transition section (boundary region) where the floor-side corner portion corresponding portion 6C and the floor-side side portion corresponding portion 6B of the weather strip are connected to each other, the wall thickness of the sealing portion gradually decreases from the floor-side corner portion corresponding portion 6C toward the floor-side side portion corresponding portion 6B. In addition, since the weather strip 6 is formed by extrusion molding, a surface of the sealing portion 20B of the floor-side side portion corresponding portion 6B and a surface of the sealing portion 20C of the floor-side corner portion corresponding portion 6C are seamlessly continuous to each other, and sealing performance such as water leakage prevention is excellent.

In the weather strip 6 according to the embodiment, a roof-side corner portion corresponding portion 6C' that is attached to the roof-side corner portion 5a of the back door opening portion 3 has the same cross-sectional shape and the same dimension as the floor-side corner portion corresponding portion 6C. That is, the wall thicknesses of the wall portions 21 and 22 (not illustrated) of the sealing portion of the roof-side corner portion corresponding portion 6C' are Tin3 and Tout3, respectively.

In the floor-side corner portion 5c of the back door opening portion 3, water leakage is less likely to occur. Therefore, even in a case where the wall thicknesses (Tin3, Tout3) of the sealing portion 20C of the floor-side corner portion corresponding portion 6C are designed to be the same as the wall thicknesses (Tin2, Tout2) of the sealing portion 20A of the pillar-side side portion corresponding portion 6A (that is, Tin2=Tin3, Tout2=Tou3), there are no problems in water leakage prevention.

A relationship between the wall thicknesses of the sealing portion 20B of the floor-side side portion corresponding portion 6B in the weather strip 6 according to the embodiment, the wall thicknesses of the sealing portion 20A of the pillar-side side portion corresponding portion 6A, and the wall thicknesses of the sealing portion 20C of the floor-side corner portion corresponding portion 6C is represented by the following expressions.

$$Tin1 < Tin2 < Tin3 \text{ or } Tin1 < Tin2 = Tin3$$

$$Tout1 < Tout2 < Tout3 \text{ or } Tout1 < Tout2 = Tout3$$

In the weather strip 6 according to the embodiment, the wall thicknesses (Tin1, Tout1) of the sealing portion 20B of the floor-side side portion corresponding portion 6B is set to be smaller than the wall thicknesses (Tin3, Tout3) of the sealing portion 20C of the floor-side corner portion corresponding portion 6C, and the wall thicknesses (Tin1, Tout1) of the sealing portion 20B of the floor-side side portion corresponding portion 6B is the smallest among the entire sealing portion. As described above, rain water falling on the roof 1a of the automobile body hardly enters into the floor-side side portion 4c of the back door opening portion 3. Therefore, by setting the portion having the smallest wall thickness among the entire sealing portion in the sealing portion 20B corresponding to floor-side side portion 4c, water leakage of rain water or the like does not occur, the weight of the weather strip 6 can be reduced, and the material costs can be reduced. Further, a closing load (closing resistance) at the time of the closing of the back door 2 can be reduced.

Second Embodiment

Figure 6:
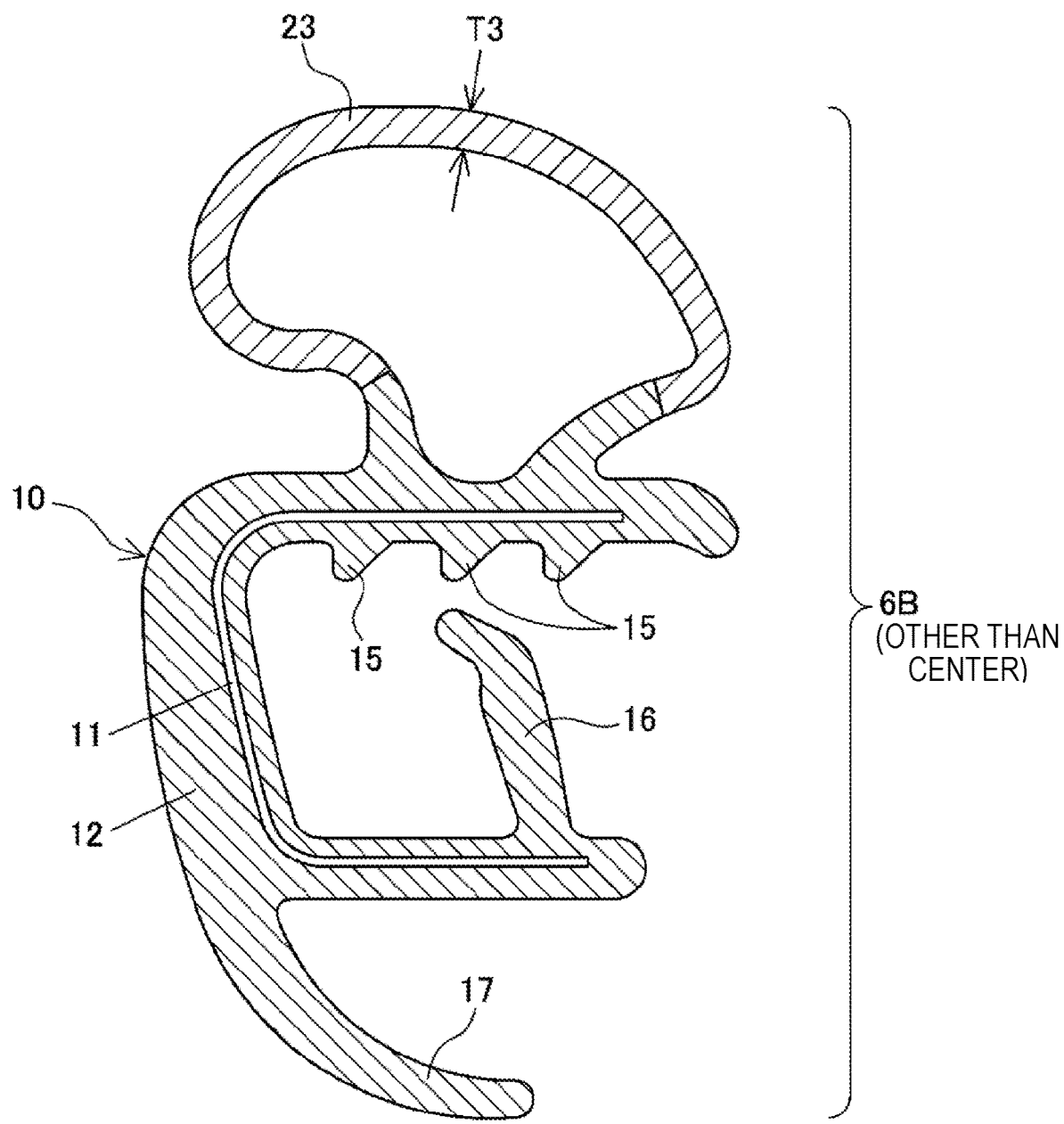
FIG. 6 is a cross-sectional view of the weather strip taken along line IV-IV of FIG. 5.
Figure 7:
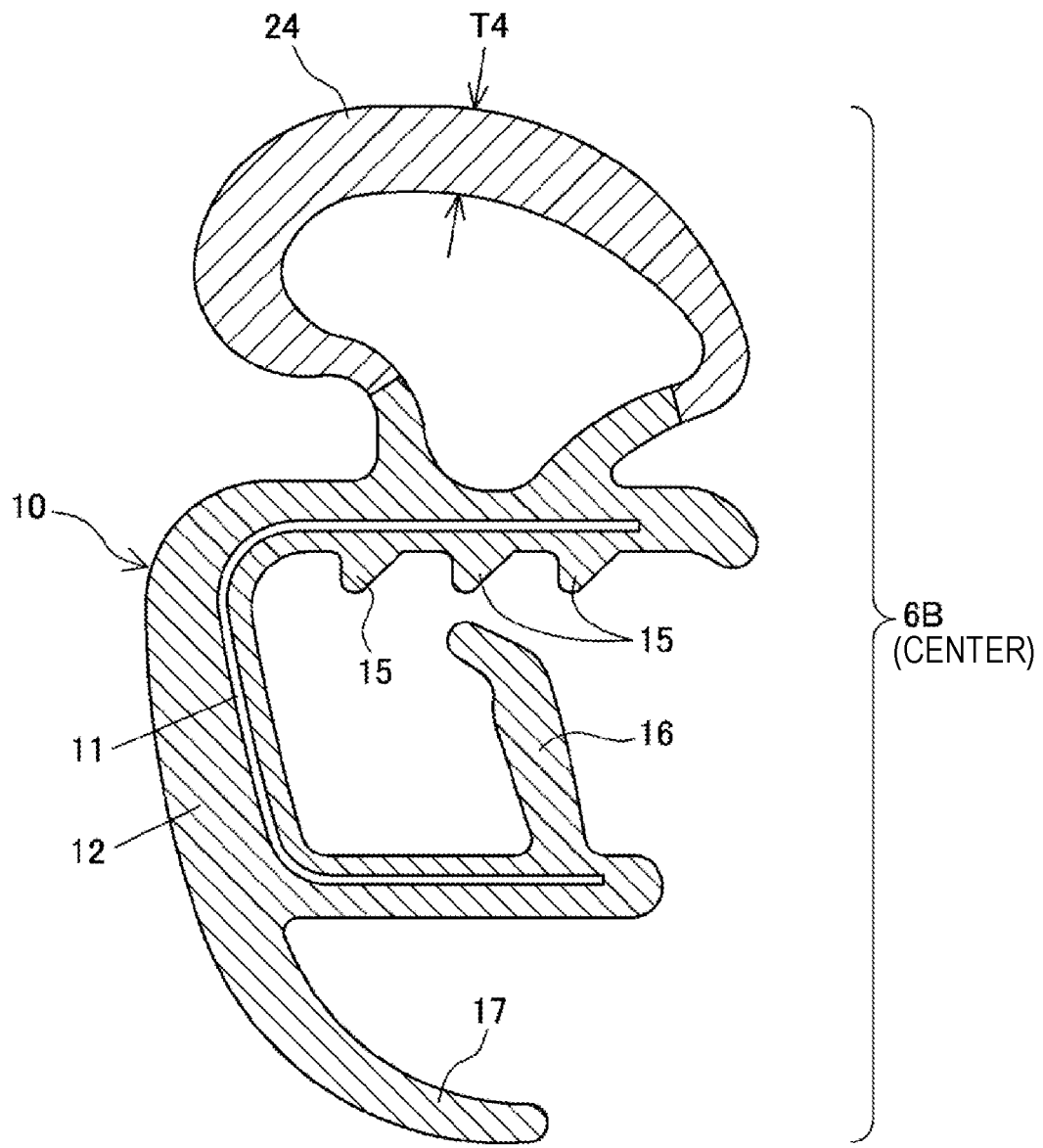
FIG. 7 is a cross-sectional view of the weather strip taken along line V-V of FIG. 5.

FIGS. 5 to 7 illustrate a weather strip according to a second embodiment of the invention. The second embodiment embodies the invention and basically has the same configuration as the first embodiment (that is, the wall thicknesses of the hollow sealing portion are appropriately set according to an attachment position). However, a configuration of the sealing portion corresponding to the floor-side side portion of the automobile body opening portion is different from that of the first embodiment. Hereinafter, this different point will be mainly described.

(A) of FIG. 5 illustrates a front door opening portion 31 and a rear door opening portion 32 of a 4-door wagon type automobile 30 in a state where a front door and a rear door are removed. The weather strip 6 is mounted over the entire peripheral length of an opening edge of each of the opening portions 31 and 32.

(B) of FIG. 5 is an enlarged view illustrating a floor-side side portion 4c of the opening edge of the front door opening portion 31, a pair of floor-side corner portions 5c that are positioned in front of and behind the floor-side side portion 4c (left and right in FIG. 5), and a pair of pillar-side side portions 4b and the vicinity thereof (here, 4b, 4c, and 5c are indicated by broken lines because they are hidden behind the weather strip 6). The weather strip 6 for the front door opening portion 31 according to the second embodiment includes at least: a pillar-side side portion corresponding portion 6A that extends in an up-down direction to correspond to the pillar-side side portion 4b; a floor-side side portion corresponding portion 6B that extends in a horizontal direction to correspond to the floor-side side portion 4c; and a floor-side corner portion corresponding portion 6c corresponding to the floor-side corner portion 5c.

FIG. 6 illustrates a cross-section taken along line IV-IV of FIG. 5, that is, a cross-section of the floor-side side portion corresponding portion 6B at a position close to the floor-side corner portion corresponding portion 6C. On the other hand, FIG. 7 is a cross-section taken along line V-V of FIG. 5, that is, a cross-section of the floor-side side portion corresponding portion 6B at a center position in a longitudinal direction. As illustrated in the drawing, the floor-side side portion corresponding portion 6B of the weather strip 6 includes: an attachment portion 10; and sealing portions 23 and 24 having a hollow tunnel shape that is disposed adjacent to the attachment portion 10.

As illustrated in FIGS. 6 and 7, the attachment portion 10 of the floor-side side portion corresponding portion 6B has the same cross-sectional shape and dimension over the entire region in the longitudinal direction. The attachment portion 10 includes: a core metal 11 having an U-shape in cross-section; a rubber cover portion 12 that covers the core metal 11; three holding projections 15 and a holding lip 16 that protrude from an inner surface of the rubber cover portion 12; and a cover lip 17 that protrudes from an outer surface of the rubber cover portion 12. An automobile side member (flange) constituting the opening edge of the front door opening portion 31 is interposed between the holding projections 15 and the holding lip 16 such that the weather strip 6 is fixed to the opening edge of the front door opening portion 31. The cover lip 17 is a lip for covering an end portion of an interior material such as a carpet or a cloth material.

The hollow sealing portion 23 (at the position of the floor-side side portion corresponding portion 6B other than the center position) illustrated in FIG. 6 and the hollow sealing portion 24 (at the center position of the floor-side side portion corresponding portion 6B) illustrated in FIG. 7 have substantially the same cross-sectional shape but have different wall portion dimensions. Specifically, a wall thickness T4 of the sealing portion 24 of FIG. 7 is set to be larger than a wall thickness T3 of the sealing portion 23 of FIG. 6 (T3<T4). As a result, the external shape and cross-sectional area of the sealing portion 24 are larger than those of the sealing portion 23. In the weather strip 6 according to the second embodiment, the wall thickness T3 of the hollow sealing portion 23 that is positioned close to the floor-side corner portion corresponding portion 6C in the floor-side side portion corresponding portion 6B is the smallest in the entire region of the sealing portion of the weather strip 6.

In the weather strip according to the second embodiment illustrated in FIGS. 5 to 7, the wall thickness T4 of the sealing portion 24 (refer to FIG. 7) corresponding to the center portion of the floor-side side portion 4c in the floor-side side portion corresponding portion 6B is larger than the wall thickness (T3) of the sealing portion (for example, the sealing portion 23 of FIG. 6) corresponding to the portions of the floor-side side portion 4c other than the center portion. Therefore, the wear resistance of the sealing portion 24 corresponding to the center portion of the floor-side side portion 4c is improved, and the repulsive force increases. In particular, due to the improvement of the wear resistance of the sealing portion 24, the durability of the floor-side side portion corresponding portion 6B against damages caused when a person gets in the automobile or a luggage is put into or taken out from the automobile is improved.

It is preferable that the same configuration as that of the second embodiment (that is, in the sealing portion corresponding to the floor-side side portion 4c, the wall thickness of the sealing portion 24 corresponding to the center portion of the floor-side side portion 4c is larger than the wall thickness of the sealing portion corresponding to the portions of the floor-side side portion 4c other than the center portion) is applied to a weather strip for the back door opening portion 3 (FIG. 1) or the trunk opening portion (not illustrated). This point will be described. In the back door opening portion 3 or the trunk opening portion, not only a locking mechanism of a door body but also a device that detects a half-shut state of a door body are provided in the vicinity of the center portion of the floor-side side portion 4c in many cases. In this case, in a case where the repulsive force of the sealing portion of the weather strip that is disposed around the half-shut state detecting device is weak, although the door body is completely shut, the detecting device may erroneously determine that "the door body is in a half-shut state" such that a door half-shut warning lamp is erroneously turned on. In order to prevent the door half-shut warning lamp from being erroneously turned on, it is preferable that the rebound resilience of the sealing portion of the weather strip disposed around the half-shut state detecting device is high to some extent. Thus, the configuration in which the wall thickness of the sealing portion 24 corresponding to the center portion of the floor-side side portion 4c is set to be relatively large such that the repulsive force of the sealing portion 24 increases has an advantageous effect in that the door half-shut warning lamp can be prevented from being erroneously turned on.

REFERENCE NUMERALS LIST

1: Automobile
3: Back door opening portion (automobile body opening portion)
4: Roof-side side portion
4b: Pillar-side side portion
4c: Floor-side side portion
5a: Roof-side corner portion
5c: Floor-side corner portion
6: Weather strip
6A: Pillar-side side portion corresponding portion
6B: Floor-side side portion corresponding portion
6C: Floor-side corner portion corresponding portion
10: Attachment portion
20A: Sealing portion (sealing portion of pillar-side side portion corresponding portion 6A)
20B: Sealing portion (sealing portion of floor-side side portion corresponding portion 6B)
20C: Sealing portion (sealing portion of floor-side corner portion corresponding portion 6C)
23: Sealing portion
24: Sealing portion
30: Automobile
31: Front door opening portion (automobile body opening portion)
32: Rear door opening portion (automobile body opening portion)

The invention claimed is:

1. A weather strip configured to be attached to an automobile body opening portion of an automobile, the automobile body opening portion being bordered with at least one side portion including a floor-side side portion and at least one corner portion which is continuous to the side portion and includes a floor-side corner portion, wherein
the weather strip is an elongated member having a length configured to correspond to the side portion and the corner portion of the automobile body opening portion and includes a hollow sealing portion,
a surface of the sealing portion corresponding to the floor-side side portion and a surface of the sealing portion corresponding to the floor-side corner portion are continuous to each other, a wall thickness of the sealing portion corresponding to the floor-side side portion is set to be smaller than a wall thickness of the sealing portion corresponding to the floor-side corner portion, the sealing portion corresponding to the floor-side side portion includes a portion having a smallest wall thickness among the entire sealing portion, and in the sealing portion corresponding to the floor-side side portion, a wall thickness of a sealing portion corresponding to a center portion of the floor-side side portion is larger than a wall thickness of a sealing portion corresponding to portions of the floor-side side portion other than the center portion.

2. The weather strip according to claim 1, wherein the surface of the sealing portion corresponding to the floor-side side portion and the surface of the sealing portion corresponding to the floor-side corner portion are seamlessly continuous to each other.

\* \* \* \* \*